(12) United States Patent
Kaneko

(10) Patent No.: US 8,166,546 B2
(45) Date of Patent: Apr. 24, 2012

(54) CONTROLLING COMPUTER PROGRAM, CONTROLLING APPARATUS, AND CONTROLLING METHOD FOR DETECTING INFECTION BY COMPUTER VIRUS

(75) Inventor: Kotaro Kaneko, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1133 days.

(21) Appl. No.: 10/647,383

(22) Filed: Aug. 26, 2003

(65) Prior Publication Data

US 2004/0193895 A1 Sep. 30, 2004

(30) Foreign Application Priority Data

Mar. 28, 2003 (JP) .................................. 2003-92416

(51) Int. Cl.
*G06F 11/00* (2006.01)
(52) U.S. Cl. ..... 726/24; 713/187; 713/188; 379/930.02; 358/1.13; 726/2; 726/11; 726/12
(58) Field of Classification Search .................... 726/24, 726/2, 11, 12; 713/188, 187; 379/93.02; 358/1.14, 1.13
See application file for complete search history.

(56) References Cited

U.S. PATENT DOCUMENTS

| | | | | | |
|---|---|---|---|---|---|
| 5,163,088 | A | * | 11/1992 | LoCascio | 379/93.02 |
| 5,623,600 | A | * | 4/1997 | Ji et al. | 726/24 |
| 5,649,095 | A | * | 7/1997 | Cozza | 714/39 |
| 5,842,002 | A | * | 11/1998 | Schnurer et al. | 703/21 |
| 5,881,151 | A | * | 3/1999 | Yamamoto | 726/24 |
| 5,918,008 | A | * | 6/1999 | Togawa et al. | 726/24 |
| 6,636,710 | B2 | * | 10/2003 | Oyaide | 399/70 |
| 6,842,861 | B1 | * | 1/2005 | Cox et al. | 713/188 |
| 7,356,832 | B1 | * | 4/2008 | Eibach et al. | 726/2 |
| 7,797,737 | B2 | * | 9/2010 | Eibach et al. | 726/11 |
| 2002/0140960 | A1 | * | 10/2002 | Ishikawa | 358/1.13 |
| 2003/0048468 | A1 | * | 3/2003 | Boldon et al. | 358/1.14 |
| 2003/0126449 | A1 | * | 7/2003 | Kelly et al. | 713/187 |
| 2003/0140049 | A1 | * | 7/2003 | Radatti | 707/100 |
| 2004/0161256 | A1 | * | 8/2004 | Ando | 399/79 |
| 2004/0193896 | A1 | * | 9/2004 | Kaneko | 713/188 |
| 2008/0092227 | A1 | * | 4/2008 | Eibach et al. | 726/12 |

FOREIGN PATENT DOCUMENTS

| | | | |
|---|---|---|---|
| JP | 5-108487 | | 4/1993 |
| JP | 05108487 A | * | 4/1993 |
| JP | 11-161517 | | 6/1999 |
| WO | WO 0072149 | * | 11/2000 |

OTHER PUBLICATIONS http://www1.ipdl.inpit.go.jp/RS1_E/cgi-bin/RS1P400.cgi/1101/, Dec. 17, 2011.*
Suguru Yamaguchi, UNIX Communication Notes: 129, UNIX Magazi NE, Japan, K.K. Asky, Mar. 1, 1999, vol. 14, No. 3, p. 18, (CS-ND-1999-00768-001).

* cited by examiner

*Primary Examiner* — Saleh Najjar
*Assistant Examiner* — April Shan
(74) *Attorney, Agent, or Firm* — Buchanan Ingersoll & Rooney PC

(57) ABSTRACT

A computer program for a controlling apparatus intended to control an image forming apparatus, executes a procedure of confirming each program running on the controlling apparatus. The computer program executes procedure of judging a program, which is not included in a preset list of programs that can be run to control the image forming apparatus among programs whose running states have been confirmed, as an illegal program resulting from computer virus infection. The illegal program is automatically deleted or isolated.

12 Claims, 5 Drawing Sheets

FIG. 6

Warning!!

An illegal request was detected.
This device might be infected with the virus.
Please contact customer service.
9999-9999-9999

CONTROLLING COMPUTER PROGRAM, CONTROLLING APPARATUS, AND CONTROLLING METHOD FOR DETECTING INFECTION BY COMPUTER VIRUS

This application is based on Japanese Patent Application No. 2003-92416, filed on Mar. 28, 2003, the contents of which are hereby incorporated by reference.

BACKGROUND OF THE INVENTION

1. Field of the Invention

The invention concerns with controlling computer program, controlling apparatus, and controlling method, in particular, controlling computer program, controlling apparatus, and controlling method for detecting infection by computer virus at the controlling apparatus.

2. Description of Related Art

Various technologies have been known for detecting infections by computer viruses (including worms), deleting or separating illegal programs and files caused by the computer viruses.

For example, Japanese Patent Application JP H09-171460A discloses a technology for detecting infections by computer viruses by means of comparing current program operations with operating specifications and/or typical operations under normal condition of a specific program, which are stored in advance. Japanese Patent Application JP H11-161517A discloses a technology for detecting infections by computer viruses based on changes in resources or file sizes stored in a apparatus such as a personal computer.

A technology has been developed in recent years that uses a personal computer loaded with a general purpose operating system as a controlling apparatus for controlling an image forming apparatus such as a Multi-Function Peripheral (MFP) instead of using hardware designed specifically for such an image forming apparatus. In such a case, the controlling apparatus that controls the image forming apparatus can get infected by computer viruses.

Many of the technologies of prior art, however, are designed to deal with infections by computer viruses of general purpose computers used for web page viewing, document preparations, e-mail transmissions, spreadsheet calculations, etc.

Many of the technologies of prior art detect computer viruses by finding signatures, format, and typical operations specific to the computer viruses in files by monitoring received or transmitted files. In such technologies, it is essential to store signatures, format, and typical operations specific to computer viruses as large scale database in order to detect the computer viruses. It is also necessary to update the database frequently to maintain it always current. Therefore, the work load for the preparation of the database is substantial. Also, it increases the load on CPU when detecting computer viruses as it makes it necessary to execute a large amount of comparison processes using a large database. Consequently, it can degrade the processing capability of the computer.

In case of a limited purpose apparatus, in particular, for example, a controlling apparatus for controlling an image forming apparatus, it may slow down the operation of the image forming apparatus due to an increase of the load on the CPU if anti-computer virus software for a general purpose computer is used.

SUMMARY OF THE INVENTION

An intention of the present invention is to provide a computer program, a controlling apparatus and a controlling method for reducing the load of preparing a database to be used for detecting computer viruses. Another intention of the present invention is to provide a computer program, a controlling apparatus and a controlling method for reducing the load on the CPU in case of detecting computer viruses. Yet another intention of the present invention is to provide a controlling computer program, a controlling apparatus, and a controlling method suitable for detecting and taking measures against computer virus infections on an apparatus with a limited purpose such as a controlling apparatus for controlling an image forming apparatus.

According to an aspect of the invention, a computer program for a controlling apparatus intended to control an image forming apparatus executes a procedure of confirming each program running on the controlling apparatus. The computer program further executes a procedure of judging a program, which is not included in a preset list of programs that can be run to control the image forming apparatus among programs whose running states have been confirmed, as an illegal program resulting from computer virus infection.

According to another aspect of the invention, a computer program for a controlling apparatus intended to control an image forming apparatus executes a procedure of confirming each file that actually exists in a specified storage area of the controlling apparatus. The computer program further executes a procedure of judging a file, which is not included in a preset list of files that are required to exist in a specified storage area of the controlling apparatus to control the image forming apparatus among files whose running states have been confirmed, as an illegal file resulting from computer virus infection.

According to still another of the invention, a controlling apparatus for controlling image forming apparatus has a storage unit for storing a list of programs that can be run for controlling the image forming apparatus. The controlling apparatus further has a processor connected to the storage unit. The processor confirms each program running on the controlling apparatus, and judges a program, which is not included in the list among programs whose running states have been confirmed, as an illegal program caused by computer viruses.

According to a further aspect of the invention, a controlling apparatus for controlling image forming apparatus has a storage unit for storing a list of files that are required to exist in a specified storage area of the controlling apparatus for controlling the image forming apparatus. The controlling apparatus further has a processor connected to the storage unit. The processor confirms each file that actually exists in a specified storage area, and judges a file, which is not included in the list among files whose existences have been confirmed, as an illegal file caused by computer viruses.

BRIEF DESCRIPTION OF THE DRAWINGS

FIG. 6 is an example of a warning document to be printed by the copying machine shown in FIG. 1.

DESCRIPTION OF THE PREFERRED EMBODIMENTS

A preferred embodiment of the invention will be described below referring to the accompanied drawings.

Figure 1:
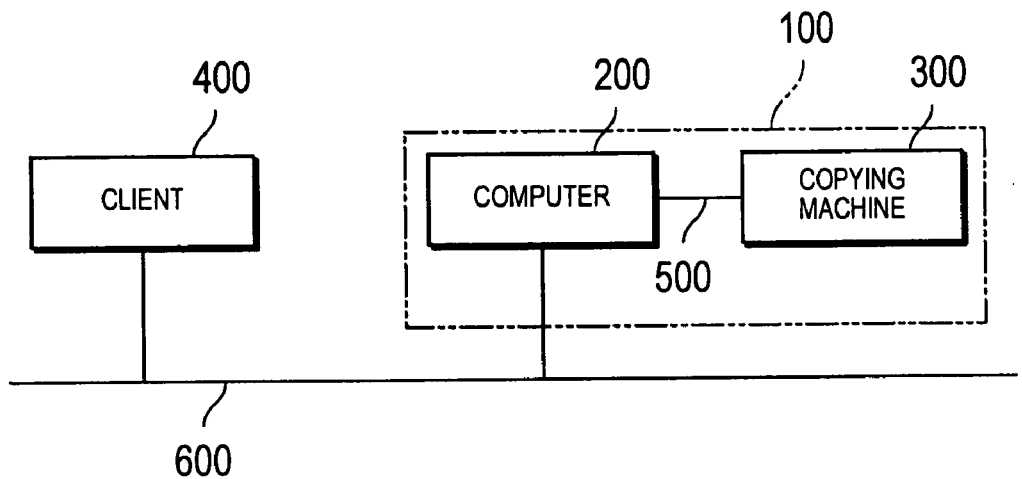
FIG. 1 is a block diagram showing the constitution of a network system in which a computer is used as a controlling apparatus according to an embodiment of the invention.

FIG. 1 is a block diagram showing the constitution of a network system in which a computer is used as a controlling apparatus according to an embodiment of the invention.

The network system shown in FIG. 1 has a Multi-Function Peripheral (MFP) 100. MFP 100 is equipped with a computer 200, which functions as a controlling apparatus, and a copying machine 300 connected to computer 200 via a cable 500.

Computer 200 is, for example, a typical personal computer or a workstation. Computer 200 preferably is loaded with a general purpose operating system (OS). Computer 200 is preferably stored in an enclosure sharing it with the copying machine 300. In other words, the purpose of computer 200 is limited to controlling image forming apparatus such as copying machine 300.

Computer 200 that constitutes MFP 100 is interconnected with a client 400 that is a typical computer, via a network 600 to be able to communicate with each other. Network 600 consists of a LAN based on a standard such as Ethernet™, Token Ring and FDDI, and/or a WAN consisting of multiple LANs connected with a dedicated line. The types and the number of equipment that can be connected to network 600 are not limited to the example shown in FIG. 1.

MFP 100 has a capability of functioning as a network printer in addition to the copying function. Therefore, it is possible to print data received via network 600 from other equipment, such as client 400, by means of copying machine 300. MFP 100 also has a function to work as a network scanner. Therefore, it is capable of transmitting the image data obtained by scanning the document by means of copying machine 300 to other equipment such as client 400 via network 600.

Figure 2:
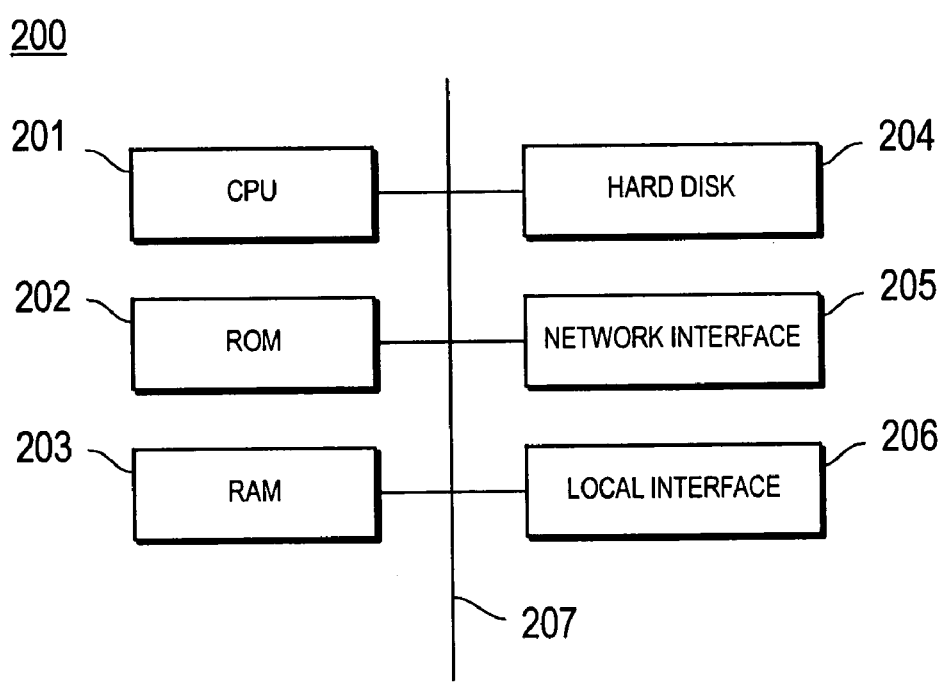
FIG. 2 is a block diagram showing a constitution of the computer shown in FIG. 1.

FIG. 2 is a block diagram showing a constitution of computer 200 shown in FIG. 1. As shown in FIG. 2, computer 200 is equipped with a CPU 201, a ROM 202, a RAM 203, and a hard disk 204. CPU 201 is in charge of controlling the entire apparatus and various arithmetic operations. ROM 202 stores programs and data. RAM 203 stores programs and data temporarily as a working area. Hard disk 204 is an external storage device for storing various programs and data. Computer 200 contains a network interface 205 such as a LAN card, and a local interface 206 for locally connecting with copying machine 300. Various constituents of computer 200 are interconnected with each other in order to exchange signals via bus 207.

Computer 200 can contain constituents other than those constituents described above. Computer 200 may lack a portion of the abovementioned constituents.

In addition to the operating system, a virus scan program is installed on hard disk 204. The virus scan program is a controlling computer program for detecting computer virus infections, and deleting or isolating illegal files or illegal programs.

Figure 3:
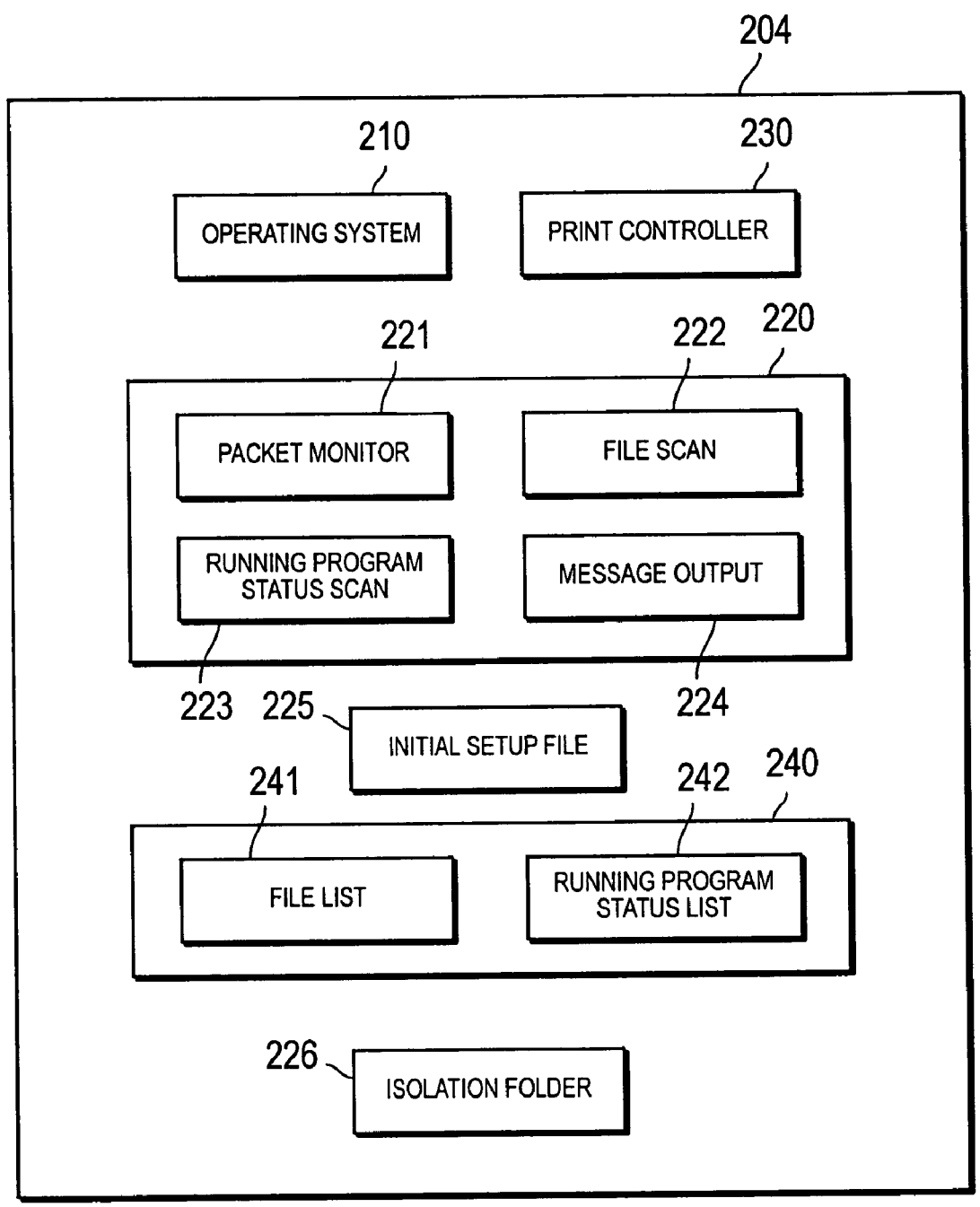
FIG. 3 is a block diagram showing the constitution of programs and files inside the computer shown in FIG. 1.

FIG. 3 is a block diagram conceptually showing the constitution of programs and files inside computer 200 when the operating system and the virus scan program are installed. These programs are executed by means of CPU 201.

As shown in FIG. 3, the programs and files are generally divided into an operating system 210, a virus scan program 220, and a print control portion 230 according to their intended functions.

Operating system 210 is a typical operating system. A program for outside communications (e.g., a browser or mailing software) can be installed accompanying the installation of the operating system.

Print control portion 230 is a program for controlling assignment of each job to MFP 100 in coordination with operating system 210.

Virus scan program 220 has multiple function modules. More specifically, virus scan program 220 contains such modules as a packet monitor 221, a file scan 222, a running program status scan 223, and a message output 224. In relation with these modules, initial setup file 225 containing various parameters and a database 240 are provided. A file list 241 and a running program status list 242 to be described later are stored in table formats in database 240. An isolation folder 226 is also provided for storing isolated illegal data files and program files to be described later.

Packet monitor 221 is a module for executing a packet check and a port check to be described later. Packet monitor 221 monitors the frequency of communications from computer 200 to the outside for detecting computer virus infections at computer 200.

File scan 222 confirms each file actually existing in computer 200, in particular, in a specified storage area of a logical drive on the hard disk 204. File scan 222 judges one or more files, which are not included in file list 241 among files whose existences are confirmed, as illegal files caused by computer virus. One or more files that are judged as illegal files are deleted or isolated into isolation folder 226.

Running program status scan 223 is a module for confirming each running program actually operated by CPU 201 on the computer 200 and judging one or more programs, which are not included in running program status list 242 among programs whose running states have been confirmed, as illegal programs. Programs that are judged as illegal programs are deleted or isolated into isolation folder 226.

Message output 224 is a module for causing printer 300 to print a warning message for warning about computer virus infections when computer virus infections were detected at computer 200.

Initial setup file 225 is a file for setting up various parameters and threshold values in advance. Initial setup file 225 also contains information for specifying processing scopes for packet monitor 221, file scan 222, and running program status scan 223.

File list 241 is a list of files required to exist in a specific storage area of a logical drive of hard disk 204 for controlling MFP 100. File list 241 contains the name of each file and the directory information of the place where it is stored. File list 241 may contain information concerning the size of each file. File list 241 is used as a reference in processing with file scan 222.

On the other hand, running program status list 242 is a list of programs running for controlling MFP 100. Running program status list 242 is used as a reference in processing with running program status scan 223. Running program status list 242 contains the name of each program (name of the execution file of each program) and the directory information of its storage location. Running program status list 242 may further contain information concerning the size of each program (size of the execution file of each program).

File list 241 and running program status list 242 are set up prior to the factory shipment of MFP 100 and others and are stored on the hard disk.

Figure 4:
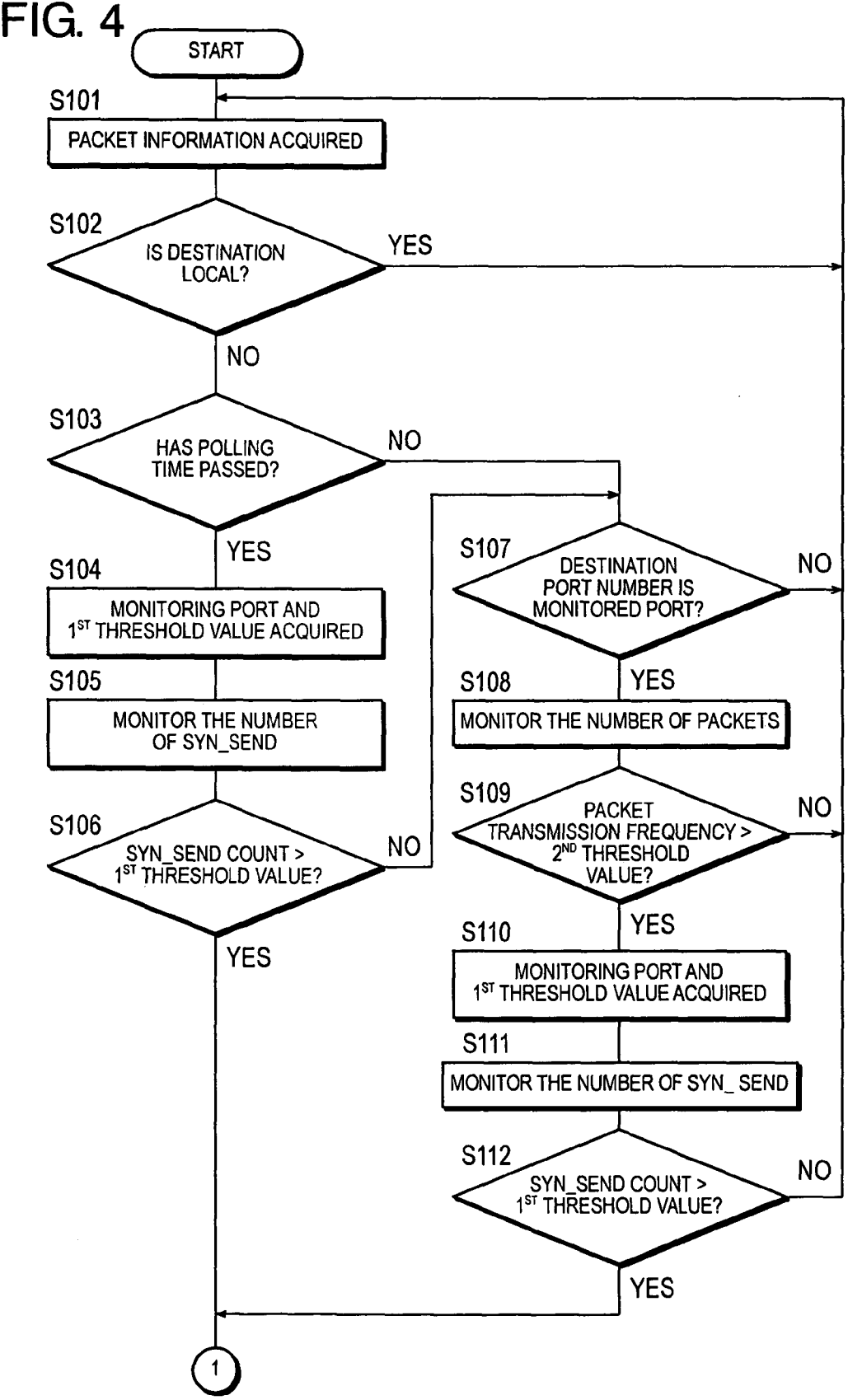
FIG. 4 is a main flowchart for describing a typical process of the computer shown in FIG. 1.
Figure 5:
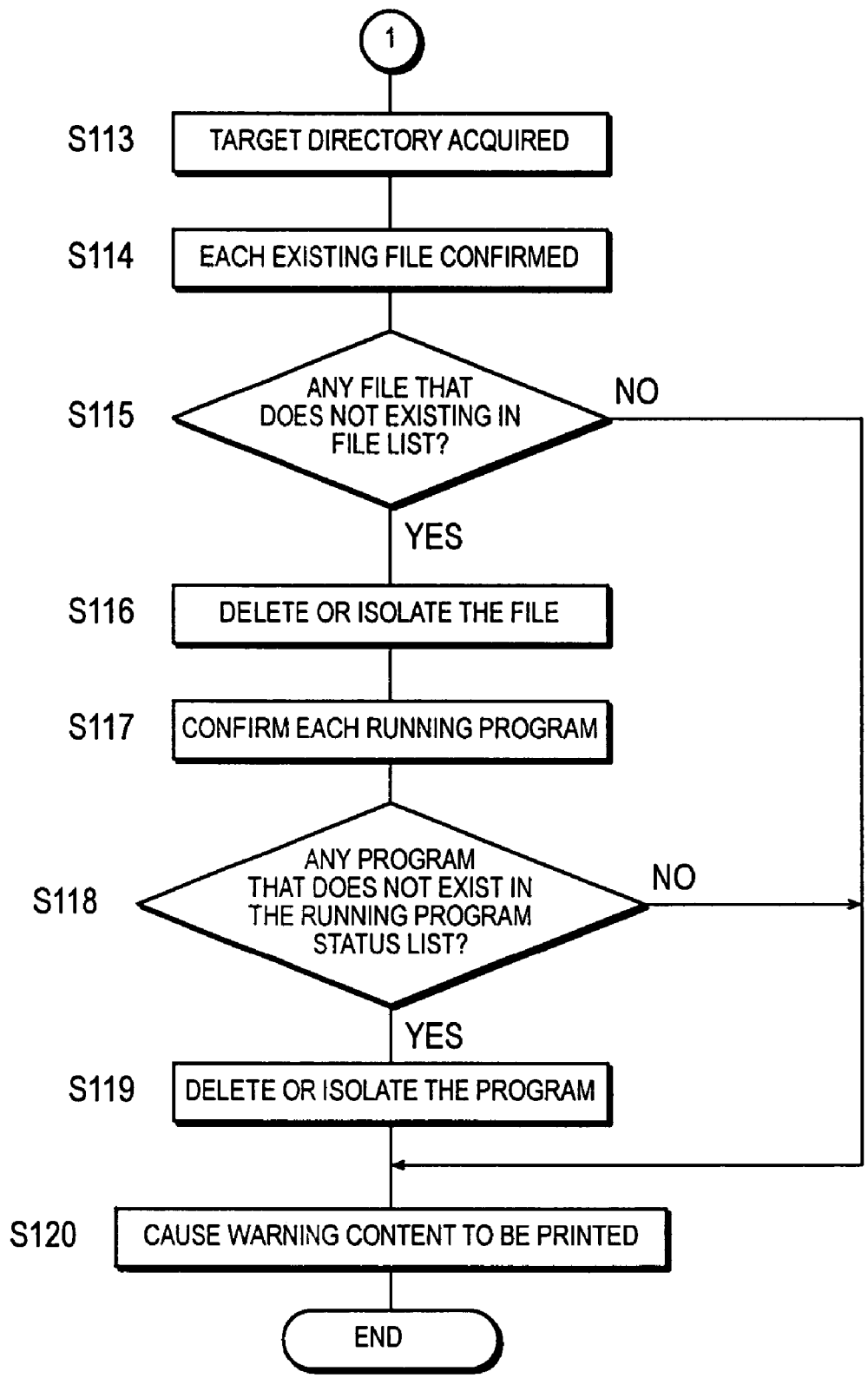
FIG. 5 is the remainder of the flowchart shown in FIG. 4.

Next, the process by computer 200 constituted as a controlling apparatus as above will be described in the following with reference to FIG. 4 and FIG. 5. The algorithm shown in the flow charts of FIG. 4 and FIG. 5 is stored on hard disk 204 of computer 200 and executed by CPU 201.

The process by computer 200 is generally divided into the process of the packet monitor and the process of the files can and the running program status scan. The process of steps S101 through S112 in FIG. 4 and FIG. 5 corresponds to the process of the packet monitor, while the process of steps S113 through S119 corresponds to the process of the file scan and running program status scan.

<Packet Monitor Process>

First, let us describe the packet monitor process. First, the information of the packet issued by network interface 205 of computer 200 is obtained (step S101). In general, the signal from computer 200 is processed in data transmission unit called a "packet." A packet includes an IP header part and a TCP header part. The IP header contains a transmission destination IP address and a transmission source IP address. The TCP header contains a transmission destination port number and a transmission source port number. In step S101, the transmission destination IP address of each packet is extracted.

Next, a judgment is made as to whether the destination of the packet, more specifically the destination IP address, is local (addressed to its own) (step S102). This determines whether the communication is to the outside. When the destination of the packet is local (step S102: Yes), monitoring of the packet will be continued returning to step S101. On the other hand, if the destination is not local but rather remote (step S102: No), the process advances to step S103 as it is recognized as a transmission to the outside.

Next, a judgment is made as to whether a specified time (polling time) has passed since a port check shown in steps S104 and S105 is done in the previous cycle (step S103). In other words, the port check is done at a certain time interval. The port check is not done continuously but rather intermittently waiting for the polling time to pass, so that CPU 201 of computer 200 can be protected from an excessive load which would otherwise be caused by conducting the port check continuously. When the polling time has passed (step S103: Yes), the process advances to step S104 and the port check process is executed.

First, the destination port which is the target of monitoring by the port check and the first threshold value are obtained (step S104). The destination port which is the target of monitoring by the port check and the first threshold value are preset and included in initial setup file 225.

More specifically, the destination port is the destination port number specified in the TCP/IP protocol. The destination port number is the information for identifying the application of the partner of communication. The address port number is 80 in case of a communication with a HTTP server, and 21 in case of a communication with an FTP server.

Next, the number of SYN_SEND is monitored (step S105). SYN_SEND here means a status where computer 200 is trying to send a message to the outside according to the TCP/IP protocol. More specifically, it means a status caused by a transmission of connection request packet (also called SYN packet) to an outside computer from computer 200. The SYN_SEND thus generated disappears as the time goes and the status changes. The number of SYN_SEND occurring at a certain time point can be monitored, for example, by the function provided at operating system 210. In actuality, the number of SYN_SEND caused by transmissions of connection request packets that are associated with a specific destination port number (80 in case of the present embodiment; it can also be 21).

Next, the confirmed number of SYN_SEND occurring at a certain time point is compared with the first threshold value (step S106). If the number of SYN_SEND occurring at a certain time point exceeds the first threshold value (step S106: Yes), it determines that a computer virus infection is detected at computer 200. When this happens, the programs caused by the computer virus will be deleted or isolated by the process of step S115 and thereafter to be described later. On the other hand, if the number of SYN_SEND occurring at a certain time point is lower than the first threshold value (step S106: No), it determines that no computer virus infection is detected, and the process advances to step S107.

In the process of the port check indicated in steps S104 through S106, computer virus infections are detected in correspondence with the number of SYN_SEND.

In general, the higher the number of partners attempted to communicate with is, the higher the number of SYN_SEND is. A SYN_SEND occurs even when a communication is attempted with a non-existent IP address or with a party with which a connection cannot be established. Since it takes a time for a status to change in such a case, the status that SYN_SEND is existing lasts longer.

A typical computer virus attempts a communication with a randomly selected IP address in order to infect a computer such as an outside server. The computer virus then replicates itself on the outside computer or attacks its vulnerability through this communication. Therefore, the number of SYN_SEND occurring at a certain time point increases when it is infected by a computer virus.

Here, the application of computer 200 of the current embodiment is limited to control of image forming apparatuses exemplified by copying machine 300. As a result, operations by users or introductions of new programs do not occur. Therefore, this computer 200 does not normally have to transmit any connection request packets to outside computers. In other words, a communication is typically initiated by computer 200 receiving a connection request packet from a client 400. Therefore, the number of SYN_SEND occurring at a certain time point does not increase when it is not infected by a computer virus. Consequently, computer virus infections can be judged based on the number of SYN_SEND.

Next, the packet check process will be described below. If it is determined at step S103 that the polling time has not passed (step S103: No), or if the number of SYN_SEND is below the first threshold value (step S106: No), the process advances to step S107.

First, a judgment is made as to whether the transmission destination port number of a packet in question is a specific destination port number (80 in this embodiment; it can be 21) that is the target of monitoring by the packet check (step S107). The specific destination port number that is the target of monitoring by the packet check is set up in advance. The contents of the set up are included in the initial setup file 225. If the transmission destination port number of the packet is different from the specific destination port number that is the target of monitoring (S107: No), the process returns to step S101 without counting up this packet, and the next packet information is obtained. On the other hand, if the transmission destination port number of the packet matched with the specific destination port number that is the target of monitoring (S107: Yes), the number of the transmitted packets will be counted (step S108). As a result of this process, the frequency of transmissions of the packet having a specific transmission destination port number is monitored. More specifically, the number of packets transmitted per unit time period is monitored.

Next, the frequency of transmissions of packets having the specific transmission destination port number is compared with the second threshold value (step S109). The second threshold value is set up in advance and is included in initial setup file 225. If the frequency of the transmission exceeds the second threshold value (step S109: Yes), there is a chance that computer 200 is infected by the computer virus. Therefore, the port check process (steps S110 through S112) is conducted from time to time regardless of whether the polling time has passed. On the other hand, if the frequency of the transmission is below the second threshold value (step S109: No), the process returns to step S101. The port check process of steps S110 through S112 is similar to the process of steps S104 through S106 described before, the detail description will not be repeated here.

As can be seen from the above, computer virus infections are detected by monitoring the frequency of outside accesses by computer 200 and comparing the frequency with the preset threshold values in this embodiment. This monitoring is conducted on the frequency of communications with a plurality of outside devices (e.g., Web servers), more specifically, the frequency of communications with specified destination ports.

In this embodiment, both the port check (refer to steps S104 through S106, and steps S110 through S112) and the packet check (steps S107 through S109) are used as a method of monitoring the frequency of communications with the outside by computer 200. In the port check, the frequency of communications with the connection request packet associated with a specific transmission destination port number (SYN packet) is monitored. In particular, the frequency of communications with a plurality of severs and such can be monitored by monitoring the number of SYN_SEND, which is a status generated as a result of transmitting connection request packet, occurring at a certain time point. On the other hand, the packet check monitors the number of packets with a specific destination port number transmitted in a unit time period.

In the port check, virus infections are judged based on the number of SYN_SEND that can easily develop a difference as a result of computer virus infections. Therefore, it has advantages that it is easy to set up the first threshold and that it is most suitable for the process of unquestionably determining the presence of infection. However, the port check applies a heavier load on CPU 201 than the packet check. Also, depending on the relation between the timing of the disappearance of SYN_SEND status and the polling time, it may not be able to check the increase of the number of SYN_SEND.

On the other hand, the packet check has a smaller effect on the processing capability of CPU 201 compared to the port check. Therefore, it is easier to execute the packet check constantly, not just execute at a certain time interval. Moreover, contrary to the case of the port check, it can check the increase of packet transmission frequency with more ease regardless of the execution timing. However, the frequency of packet transmission can increase to a high value despite the fact that there is no computer virus infection as in the case of printing with copying machine 300 receiving a large quantity of data from client 400. Therefore, the second threshold value may be difficult to be set up in such a case.

Consequently, using the port check process and the packet check process in combination taking advantage of each of those methods as shown in FIG. 4 can determine the presence of computer virus infection more assuredly without increasing the load on CPU 201.

However, contrary to this embodiment, it is also possible to detect computer virus infections at computer 200 by means of monitoring the frequency of communications to the outside from computer 200 using either one of the packet check and the port check.

<Processes of the File Scan and the Running Program Status Scan>

Next, let us describe the measures to be taken when it is determined that computer 200 is infected by computer viruses. In this embodiment, the file scan and the running program status scan will be executed in such a case.

First, let us describe the file scan process shown in steps S113 through step S116.

As a premise of the file scan, file list 241, i.e., the list of all files which need to be present in the specified storage area (specified directory) on the logic drive of hard disk 204 of computer 200 in order to control MFP 100, is set up and stored. The files required for controlling MFP 100 are, for example, the operating system and the print control file. File list 241 is set up and stored when computer 200 is not infected by computer viruses.

Next, in an actual process, information concerning the specified storage area to be monitored is obtained referring to initial setup file 225 (step S113). In reality, one or more specific directories are preset on the logic drive of hard disk 204 as the specified storage area. In step S113, information for specifying the specific directories is obtained. Each file existing in the specific directories is then confirmed. The specific storage area can be specified in more detail using file extensions. The specified storage area preferably does not include a directory where a file increment can occur as in the case of a directory used for temporarily storing printing data when MPF 100 executes a printing job.

Next, each file actually existing in the specified storage areas of hard disk 204 of computer 200 is confirmed (step S114). In reality, the name of each file existing in a directory corresponding to the specified storage area is confirmed. It is also possible to confirm the size of each file.

Next, a judgment is made whether there is any file not included in file list 241 among the files confirmed in step S114 (step S115). Specifically, the name of each file confirmed in step S114 is compared with the name of each file included in file list 241. Also, the size of each file confirmed in step S114 can be compared with the size of each file included in file list 241.

If a file that is not included in file list 241 is found among the files confirmed in step S114 (step S115: Yes), the file not included in file list 241 is judged as an illegal file caused by a computer virus and the process advances to step S116. On the other hand, if all the files confirmed in step S114 are found in file list 241 (step S115: No), the process advances to step S120.

When a computer virus infiltrates into computer 200, it often creates a new file. The file scan process shown by steps S113 through S116 is to detect such a symptom and find the file created by the computer virus to remove it.

When a computer virus infiltrate into computer 200, it often creates a new file. The file scan process shown by steps S113 through S116 is to detect such a symptom and find the file created by the computer virus to remove it.

Computer 200 is a controlling apparatus for controlling an image forming apparatus such as copying machine 300 and its application is limited. Therefore, it is different from a general-purpose machine and it is difficult for a user to conduct operations such as preparing new files, or install software. When computer 200 is sharing the same cabinet with copying machine 300, this tendency is even stronger.

Therefore, if a list of files necessary for controlling the image forming apparatus is prepared in advance and if any new file not included in the file list is found, it can be judged as a file generated by a computer virus. Thus, by applying the process of the file scan to computer 200 whose application is limited, it is possible to efficiently remove or isolate files infected by computer viruses.

Next, the process of the running program status scan shown in steps S117 through S119 will be described.

As a premise of the running program status scan, running program status list 242, i.e., the list of programs that can be run for controlling MFP 100, is set up and stored in advance. The programs that can be run for controlling MFP 100 include, for example, the operating system and the program that correspond to the print control. Running program status list 242 is setup and stored when computer 200 is not infected by computer viruses.

First, programs that are actually running by CPU 201 on the computer 200 are confirmed (step S117). For example, programs that are actually running are confirmed using a function that operating system 210 has. As a result, all the programs that are actually running can be confirmed in the condition listed up. Specifically, the names and sizes of the programs that are in running conditions are confirmed.

Next, a judgment is made whether there is any program that is not included in running program status list 242 among the programs that are confirmed to be running in step S117 (step S118). Specifically, the name of each program that is confirmed to be running is compared with the name of each program included in running program status list 242. It is also possible to compare the size of each program that are confirmed to be running with the size of each program included in running program status list 242.

If a program that is not included in running program status list 242 is found among the programs confirmed in step S117 (step S118: Yes), the program not included in file list 242 is judged as an illegal program caused by a computer virus and the process advances to step S119. On the other hand, if all the programs confirmed in step S117 are found in running program status list 242 (step S118: No), the process advances to step S120.

Next, the execution type program file of the program determined as an illegal program is deleted or isolated into isolation folder 226 (step S119).

When a computer virus infiltrates into computer 200, a program unrelated to the control of the image forming apparatus is often executed by the computer virus. The process of running program status scan shown by steps S117 through S119 is a process of detecting such a symptom, finding out a program executed by the computer virus, and removing or isolating the program file.

Computer 200 is a controlling apparatus for controlling an image forming apparatus such as copying machine 300 and its application is limited. Therefore, different from the case of a general-purpose computer, the user does not operate it to execute a program unrelated to the control of the image forming apparatus. When computer 200 is sharing the same cabinet with copying machine 300, this tendency is even stronger.

Therefore, if the running program status list, which is the list of programs that can be run for controlling the image forming apparatus, is prepared in advance, and if the running program that is not included in the running program status list occurs, the program can be determined as either a computer virus itself or the program being executed by a computer virus. Thus, by applying the process of the running program status scan to computer 200 whose application is limited, it is possible to efficiently remove or isolate computer viruses or programs infected by computer viruses.

Lastly, let us describe the printing process for warning the user of the fact that the system is infected by a computer virus. In other words, this printing process is to let MFP 100 controlled by computer 200 print a warning content in case a computer virus infection is detected.

As shown in step S120 of FIG. 5, computer 200 causes copying machine 300 to print its judgment result that it is infected by a virus when computer 200 determines that it is infected by the computer virus. In other words, using its own printing function, MPF 100 is capable of printing a warning document that contains a message that computer 200 built into itself as its controlling apparatus is infected by a computer virus.

FIG. 6 shows an example of the warning content to be printed. The warning content is printed based on image data stored in advance in hard disk 204.

Although a case of executing the running program status scan (steps S117 through S119) is executed after the file scan process (steps S113 through S116) is executed in the above example, the order of executing the file scan process and the running program status scan is not limited to it.

Also, in the above example, a case of executing the file scan process and the running program status scan process only when a computer virus infection of computer 200 becomes apparent as a result of the port check (steps S104 through S106, and steps S110 through S112), and/or the packet check (steps S107 through S109) was described. The reason such a constitution is adopted is that the process of the file scan and the process of the running program status scan applies a heavier load on CPU 201 than the process of the packet check. In other words, the continuous execution of the file scan process and the running program status scan process is avoided in order to reduce their effects on the processing capability when CPU 201 is controlling MFP 100.

However, it is also possible to execute the file scan process and/or the running program status scan independent from the port check and the packet check. It is also possible to conduct processes other than the file scan process and/or the running program status scan when computer virus infections at computer 200 became clear as a result of the port check and/or the packet check. For example, it is possible to provide only a warning when a computer virus infection is detected.

Although computer 200 is used as an example of a controlling apparatus for controlling MFP 100, the invention is not limited to it. The present invention can be applied to various kinds of controlling apparatuses.

The means of implementing various processes on the controlling apparatus in this invention can be realized either by a dedicated hardware circuit or a programmed computer. The above-mentioned program can be provided by a computer-readable recording medium such as a flexible disk and CD-ROM. The above-mentioned program can also be provided online via a network such as the Internet. The program recorded on a computer-readable recording medium is typically transferred to and stored on a memory unit such as a hard disk. The above-mentioned program can be provided either as independent application software or as built into the software of an apparatus as one of its function.

As can be seen from the above, the controlling computer program, controlling apparatus, and controlling method according to this embodiment provides a means of reducing the work load in preparing the database needed for detecting computer viruses as well as reducing the work load of the computer virus detection process. In particular, the invention provides a controlling computer program, controlling apparatus and controlling method having computer virus countermeasure functions suitable for an apparatus with a limited application such as a controlling apparatus for controlling an image forming apparatus.

Although the preferable embodiment of the invention was described in the above, it is obvious that various changes, additions, and omissions can be made for a person skilled in the art within the spirit and scope of the invention claimed.

What is claimed is:

1. A non-transitory computer-readable recording medium having a computer program stored thereon that causes a controlling apparatus intended to control an image forming apparatus to execute the procedures of:
   storing a preset list of programs that are authorized to be run on said controlling apparatus to control the image forming apparatus, the preset list being exhaustively inclusive of every program which is authorized to be run on said controlling apparatus;
   confirming each program actively running on said controlling apparatus;
   judging each program, which is not included in the preset list of programs that are authorized to be run to control the image forming apparatus among programs whose active running states have been confirmed, as an illegal program resulting from a computer virus infection; and
   automatically inhibiting every program that is judged to be an illegal program from being run on said controlling apparatus.

2. A computer program of claim 1, wherein the procedure of automatically inhibiting the illegal program includes deleting or isolating the illegal program in response to said judgment.

3. A computer program of claim 1, wherein the procedure of judging includes a procedure of comparing the name of each program whose running state has been confirmed with the name of each program included in said preset list.

4. A computer program of claim 1, wherein the procedure of judging includes a procedure of comparing the size of each program whose running state has been confirmed with the size of each program included in said preset list.

5. A controlling apparatus for controlling an image forming apparatus, said controlling apparatus comprising:
   a storage unit for storing in advance a preset list of programs that are authorized to be run on said controlling apparatus for controlling said image forming apparatus, the preset list being exhaustively inclusive of every program which is authorized to be run on said controlling apparatus; and
   a processor connected to said storage unit, wherein said processor is configured to confirm each program actively running on said controlling apparatus, judge each program, which is not included in said preset list of authorized programs among programs whose active running states have been confirmed, as an illegal program resulting from a computer virus infection, and automatically inhibit every program that is judged to be an illegal program from being run on said controlling apparatus to control said image forming apparatus.

6. A controlling apparatus of claim 5, wherein said processor is configured to automatically inhibit the illegal program from by running on said controlling apparatus by deleting or isolating the illegal program.

7. A controlling apparatus of claim 5, wherein said processor is configured to compare the name of each program whose running state has been confirmed with the name of each program included in said preset list.

8. A controlling apparatus of claim 5, wherein said processor is configured to compare the size of each program whose running state has been confirmed with the size of each program included in said preset list.

9. A controlling method for a controlling apparatus intended to control an image forming apparatus, comprising the steps of:
   storing a preset list of programs that are authorized to be run on said controlling apparatus to control the image forming apparatus, the preset list being exhaustively inclusive of every program which is authorized to be run on said controlling apparatus;
   confirming each program actively running on said controlling apparatus;
   judging each program, which is not included in the preset list of programs that are authorized to be run to control the image forming apparatus among programs whose active running states have been confirmed, as an illegal program resulting from computer virus infection; and
   automatically inhibiting every program that is judged to be the illegal program from being run on said controlling apparatus.

10. A controlling method of claim 9, wherein the step of automatically inhibiting the illegal program includes deleting or isolating the illegal program in response to said judgment.

11. A controlling method of claim 9, wherein the step of judging includes comparing the name of each program whose running state has been confirmed with the name of each program included in said preset list.

12. A controlling method of claim 9, wherein the step of judging includes comparing the size of each program whose running state has been confirmed with the size of each program included in said preset list.

* * * * *